Oct. 27, 1959  C. F. FREY ET AL  2,910,561
CIRCUIT BREAKER DEVICE
Filed Aug. 4, 1958
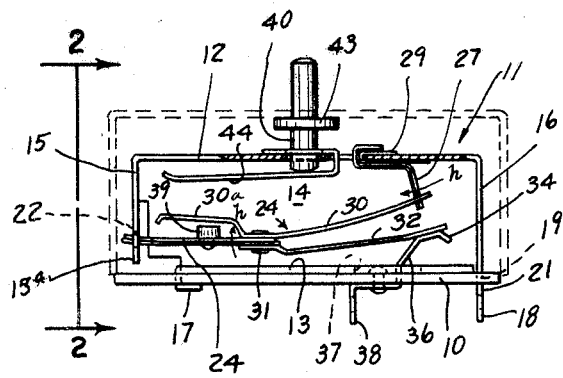
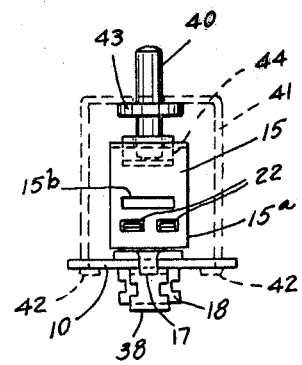
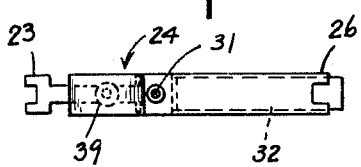
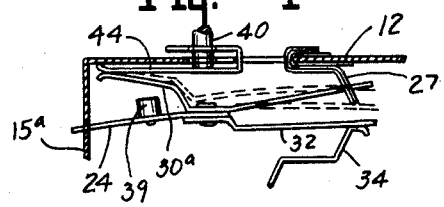
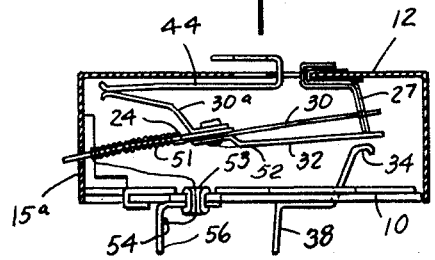
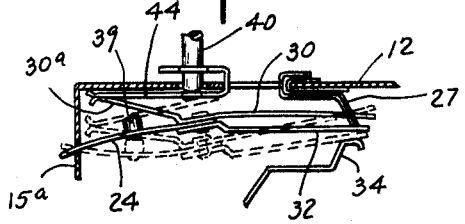
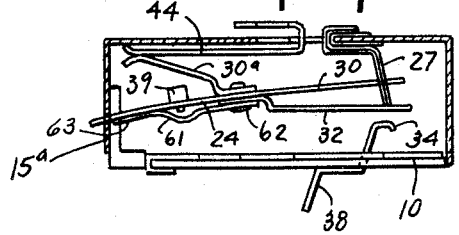
INVENTORS.
CLEON F. FREY.
MYRON F. MELVIN.
BY
Lockwood, Galt, Woodard & Smith.
ATTORNEYS.

United States Patent Office 2,910,561
Patented Oct. 27, 1959

2,910,561

CIRCUIT BREAKER DEVICE

Cleon F. Frey, Sebastian, Fla., and Myron F. Melvin, Indianapolis, Ind.

Application August 4, 1958, Serial No. 752,971

7 Claims. (Cl. 200—116)

This invention relates generally to electrical circuit breakers, and in particular to circuit breakers adapted to protect electronic circuitry, electrical appliances and the like.

For many years appliances, electronic circuits and comparable apparatus have utilized as protective devices fuses, various types of circuit breakers, or resistances which have characteristics permitting them to act as fuses should protection be required. While many of these devices perform satisfactorily, the delicacy of modern electronic circuitry, such as that found in television receivers, require a more accurate and dependable overload protective device.

Since the electronic circuits of, for example, television receivers, consist of a rather delicate arrangement of components into complex circuit networks, relatively small variations in the operating characteristics of different components of the circuits can cause widely varying and sometimes dangerous operating currents at the A.C. line. Intermittent conditions can also occur wherein a momentary, substantial gain in load current is encountered. After a brief interval the load current returns to normal and it is therefore desirable that the protective circuit breaker be prevented from tripping its contacts into open position during these momentary current surges. As applied to television receivers, a resettable circuit breaker, such as that provided by the present invention has further advantages over the use of a fuse or fusible resistor as an overload protective device. Among these advantages is the convenience of merely resetting the circuit breaker by means of its push button as compared to replacing fuses, when means for replacement are provided, or removing the fuse from the circuit when it is permanently wired therein. Since resetting of the circuit breaker is an operation which can be performed by the television set owner, many unnecessary service calls can be eleminated.

Fuse type overload devices have in the past been mounted in a small housing which is adapted to accept a male electrical plug connected to an electrical appliance or similar device. The housing is provided with spaced prongs which may be plugged into a conventional electrical outlet, the fuse being thereby connected in series with the appliance. This type of device is also subject to the difficulty referred to above, that is, replacement of a fuse requires disassembly of the housing and is inconvenient. The present invention envisages a bimetal operated circuit breaker which, because of its relatively small size and reliability, can be adapted for mounting as above described.

Difficulties encountered in the use of conventional circuit breakers have usually fallen into three categories, one type of difficulty involves "cycling" of the circuit breaker. This occurs due to, for example, reduction of the contact pressure to zero and subsequent slight opening and reclosing of the contacts. A further difficulty with conventional circuit breakers is their failure to have incorporated therein a means for accurate ambient temperature compensation. While most electronic devices operate in room temperatures of 65 to 80 degrees F., the ambient temperature can go as high as 120 degrees. Under these elevated ambient temperatures, unless the circuit breaker is properly compensated, the trip point of the breaker will be substantially shifted so that false tripping or opening of the breaker contacts can occur. The third type of difficulty encountered in conventional circuit breakers is that of sticking or welding of the contacts when the contacts move apart slowly.

It is the primary object of the present invention therefore to provide a circuit breaker wherein the contact pressure is increased prior to opening, which is accurately compensated for ambient temperature changes, and, because of a wiping action of its contacts upon opening and closing, is not subjected to contact sticking or welding.

A further object of the present invention is to provide a circuit breaker device having a novel means for delaying the tripping action of the circuit breaker, thereby preventing its operation in response to transient overloads.

A further object of the present invention is to provide a circuit breaker device having means for adjustably varying the predetermined overload current required to trip or open the circuit breaker.

A further object of the present invention is to provide a circuit breaker device which is extremely small in over-all dimensions and lends itself to economical manufacture in mass production.

A further object of the present invention is to provide a bimetal operated circuit breaker device which can be conveniently modified by the addition of either a series connected heater or a parallel connected heater in heat transmitting relation to the bimetal element to cover a wide range of load currents.

A further object of the present invention is to provide a bimetal operated circuit breaker device having a resetting means which prevents premanent distortion of the breaker parts when resetting is performed with the bimetal element in heated condition.

A further object of the present invention is to provide bimetal operated circuit breaker device having a manually operated resetting structure wherein the bimetal operator is electrically shunted while the resetting structure is in reset position.

Other objects will become apparent as the description proceeds with reference to the accompanying drawings in which:

Fig. 1 is a side view of a circuit breaker device embodying the present invention.

Fig. 2 is an end view taken generally in the direction indicated at the line 2—2 of Fig. 1.

Fig. 3 is a top plan view of one component of the circuit breaker shown in Fig. 1.

Fig. 4 is a fragmentary, schematic view of certain of the components of the circuit breaker shown in Fig. 1.

Fig. 5 is a view similar to Fig. 4 but showing the components during the resetting operation.

Fig. 6 is a side view of a portion of a modified form of the circuit breaker device.

Fig. 7 is a side view of a further modified form of the circuit breaker device.

Referring initially to Figs. 1, 2 and 3, there is shown at 10 a generally rectangular base formed of phenolic, pressed paper, or similar insulating material. The base carries a housing 11 which includes a top wall 12, a bottom wall 13 and side wall 14 and end walls 15 and 16. As may be seen in Fig. 1, the housing provides a generally rectangular box or girder, open at one side. The bottom wall 13 is provided with a tab 17 which extends through a slot in the base and is bent into overlying relation thereto.

The side wall 16 has an extending tab 18 which is accommodated within a slot 19 in the base, the tab being reduced in width at its area of extension through the slot and being provided with a widened portion 21 just below the slot which, together with the tab 17, serves to rigidly mount the housing upon the base.

As may be seen in Fig. 2, the side wall 15 has adjacent apertures 22 therein which accommodate the bifurcated end 23 of a bimetal blade 24. At its opposite end the bimetal blade is secured to the central portion 10 of a resilient member 30 by means of a rivet 31. The portion 30a of the resilient member extending to the left of the rivet 31 is formed to extend in overlying, spaced relation to the bimetal blade 24 and forms a part of the resetting structure to be subsequently described. The bifurcated end 26 of the member 30 accommodates the narrowed portion of the downwardly extending end of a bimetal member 27. The opposite end of the member 27 extends through a suitably proportioned aperture in the top wall 12 and is reversely bent to clamp the member 27 to the wall 12, a pad of insulating material 29 being interposed between the member and the wall to thereby thermally and electrically isolate the member 27. The bimetal element 27 is arranged so that its depending end moves leftwardly, as viewed in Fig. 1, as its temperature increases to thereby exert an increasing compressive stress on the member 30 and on the bimetal blade 24.

A somewhat resilient blade 32 having a contact surface 33 at its free end is secured by means of rivet 31 to the assembly formed of bimetal blade 24 and resilient member 30. Cooperating with the contact surface 33 is a fixed contact 34 formed on the curved end of a member 36. The bottom wall 13 has an aperture 37 formed therein to permit the member 36 to extend through an appropriate opening in the base without coming into electrical contact with the bottom wall. The member 36 is bent into underlying relation with the base, is riveted thereto, and terminates in a downwardly-extending connecting lug 38.

Intermediate its pivotal support on the end wall 15 and its point of junction with the member 32, the bimetal blade 24 supports a solid, cylindrical copper slug 39. The slug is mounted on the bimetal blade so as to provide high thermal conductivity therebetween and acts as a thermal reservoir, absorbing heat from the bimetal member. Since the function of the copper slug is to act as a thermal reservoir or heat sink, it will be understood that it might be formed in any configuration having a high mass to surface area ratio, and may be formed of a material other than copper, the requirement being that it have controlled thermal conductivity.

The housing is provided with an enclosing casing 41, as indicated by broken lines in Fig. 1. This casing is here shown as having a generally open-ended, rectangular configuration and may be secured to the base by bent-over tabs 42 which extend through appropriately positioned apertures in the base. The casing itself forms no part of the present invention and might have any suitable configuration, its function being to protect the housing and the circuit breaker components incorporated therein.

A resilient blade 44, formed of Phosphor bronze or similar material, extends along the underface of the top wall 12 and upwardly through an aperture therein. The extending end of the blade is reversely bent to overlie the wall 12 and is held in place by a reset button or thrust pin 40 which extends through aligned apertures in the top wall and the blade 44. The inner end of the thrust pin engages the blade 44, the pin extending exteriorly of the housing with the limit of its outward movement being defined by a collar 43 on the pin.

In operation, the circuit breaker may be connected into the circuit being protected by means of the connecting lugs 38 and 18. When so connected, it will be apparent that an electrical circuit may be traced through the circuit breaker from the lug 18, the wall 16, top wall 12, side wall 15, the bimetal blade 24, the movable contact member 32, the fixed contact 34, and lug 38. Should the current passing through the circuit breaker rise to a predetermined value, the heat consequently generated in the current carrying portion of the bimetal blade will cause it to move upwardly as indicated by the arrow in Fig. 1.

It will be apparent that this initial upward movement causes an increase in the contact pressure at the surface of the fixed contact 34 and also produces a slight wiping action of the movable contact member over the fixed contact 34. This intermediate position of the bimetal blade is illustrated in solid lines in Fig. 4.

As the current carrying bimetal blade deflects beyond its solid line position of Fig. 4, it will be snapped across its axis of support to a stable position as illustrated by broken lines in Fig. 4. In the movement from its initial stable position to its subsequent stable position, it will be noted that the contact surfaces provided by the member 32 and the fixed contact 34 are initially provided with increased contact pressure and then are snapped apart.

Because of the problem of false lockouts on the transient overload conditions, previously referred to, it is desirable to provide the circuit breaker with means for producing a time delay, which may be of the order of thirty seconds, between the time at which the overload current level is reached and the circuit breaker trips to open position. In order to obtain this delay, conventional circuit breakers mechanically over-stress the thermally responsive element so that an excessive amount of work must be expended before the contacts will break. Since it is a characteristic of bimetal temperature responsive elements that most of their mechanical deflection occurs within the first few seconds after the overload current level is reached, obtaining accuracy on a unit of the conventional type referred to is extremely difficult. This design problem in conventional circuit breakers requires that the mechanical adjustment must be extremely precise since the circuit breaker must operate after most of the deflection of its bimetal element has been completed. Further, the over-stressed condition of the bimetal element causes fatigue to develop therein which produces variation in the characteristics of the element after prolonged use.

The present invention overcomes the design difficulty referred to above and provides the required delay time through use of the thermal reservoir provided by the copper slug 39. As the current through the circuit breaker embodying the present invention reaches the overload level, the current carrying bimetal blade will heat internally. The temperature rise within the bimetal blade, and consequently its deflection will be delayed, however, by the conduction of heat to the thermal reservoir provided by the slug 39. It will be understood that by adjusting the location and the thermal capacity of the reservoir the time delay produced thereby may be varied over a relatively wide range. Since the time delay does not require over stressing of the bimetal blade, greater accuracy in fixing the trip point of the circuit breaker can be obtained and deformation or fatigue of the bimetal blade is minimized.

Since the force-deflection product or work, necessary to move the bimetal blade from its initial position to its final stable position determines the current level at which the circuit breaker will trip to open position, it will be evident that varying the longitudinal compressive stress on the bimetal blade provides a convenient means for adjusting the trip point. This adjustment is carried out on the circuit breaker of the present invention by bending or deforming the freely-extending lower end 15a of the end wall 15, either inwardly or outwardly. As may best be seen in Fig. 2, the end 15a of the side wall is weakened against bending stress by the provision of the elongated aperture 15b, the aperture serving to localize the deformation of the side wall and preventing distortion of the upper portion of the end wall and the housing.

It will be evident that should it be desired to raise the current level at which the circuit breaker will trip to open position, the extending end 15a of the end wall may be deformed inwardly, increasing the compressive stress on the bimetal blade. Similarly, should it be desired to lower the current level at which the circuit breaker trips to open position, the lower end 15a of the end wall may be deformed outwardly, decreasing the compressive stress on the bimetal blade.

Ambient temperature compensation of the circuit breaker is provided by the bimetal member 27. As indicated by the arrow in Fig. 1, upon an increase in ambient temperature the member 27 moves to increase the compressive stress on the bimetal blade, thereby compensating for the effect of the increased ambient temperature thereon. Similarly, upon a decrease of ambient temperature the member 27 moves to lessen the compressive stress on the bimetal blade, thereby compensating for the effect thereon of the reduced ambient temperature.

After the circuit breaker has tripped to open position (indicated by broken lines in Fig. 4), it may be reset to closed position by depressing the reset button 40. Initial inward movement of the push button lowers the free end of blade 44 into engagement with portion 30a of resilient member 30 as shown in Fig. 5. Further inward movement of the push button deflects the portion 30a, the energy stored in the elastic system thereby provided eventually being sufficient to cause the bimetal blade to snap across its axis of support and assume its initial stable position indicated by broken lines in Fig. 5. It will be evident from Fig. 5 that as the bimetal blade moves into its broken line position the movable contact member will wipe across the face of the fixed contact 34 providing a self-cleaning feature as the circuit breaker is reset The circuit breaker device described in the foregoing utilizes the heat generated in the bimetal element by the passage of electrical current therethrough to provide the necessary tripping deflection. This arrangement is entirely adequate for an intermediate range of current values of, for example 1.5 to 2.2 amperes.

A modified form of the circuit breaker device of the present invention is shown in Fig. 6 and this form of the device is particularly adapted for use in a relatively low current range of, for example, one hundred milliamps to one ampere. In Fig. 6 parts which are identical to those previously described are given the same reference numerals as in Figs. 1 through 5. The contact structure, bimetal 24, resilient member 30, and contact blade 32 cooperate to provide a moveable contact structure which is tripped to open position by deflection of the bimetal blade. A heater 51, wound about the bimetal blade, is electrically connected at 52, by solder or other suitable means, to the contact carrying blade 32. The opposite end of the heater wire passes through an eyelet 53 and is soldered at 54 to a terminal lug 56, the lug being attached to the base 10 by eyelet 53. The heater is thus connected in series with the breaker contacts and, upon an overload, deflects the bimetal blade sufficiently to cause the contacts to be tripped open. Since the bimetal is thus heated indirectly, the time rate of heat transfer between the heater and the bimetal is sufficiently low to render use of the thermal reservoir, in the form of copper slug 39, unnecessary. In this form of the circuit breaker device the terminal lugs 38 and 54 are utilized for connecting the breaker into the circuit to be protected..

A further modified form of the circuit breaker device is shown in Fig. 7, this modification being adapted for load currents of a higher range, for example, from 2.2 amperes and above. The structure shown in Fig. 7 is identical to that described with reference to Figs. 1 through 5, except that metal strap 61 is welded at 62 to the junction of bimetal blade 24 and contact carrying blade 32. The opposite end of the strap is welded to the bimetal blade at 63 and to the depending tip 15a of the sidewall 15. The metal strap is thus connected in parallel to the bimetal blade in the electrical circuit through the circuit breaker. The shunting effect of the metal strap reduces the current carried by the bimetal blade to the proper value for operation of the breaker. Any heat generated in the strap 61 is transferred to the bimetal and adds to the heat generated internally in the bimetal by the passage therethrough of its portion of the total load current.

From the foregoing it will be evident that the present invention provides a circuit breaker which can be accurately adjusted since it does not depend upon over stressing of its temperature responsive element to provide the necessary time delay of the tripping action. The construction wherein the components of the circuit breaker are supported by an integral housing, because of the rigidity provided thereby, results in a device which is reliable and accurate even after prolonged use. The construction of the present invention uses a minimum amount of bimetal and can be manufactured at relatively low cost.

The elastic system formed by the resetting members 44 and 30a permit the push button to be moved to reset position without permanently deforming the bimetal blade 24 even though the resetting operation is performed immediately after the contacts have been tripped open and the bimetal is at the trip point temperature. It should also be noted that as soon as the member 44 is brought into contact with the portion 30a during the initial portion of the resetting movement, an electrical path is established which by-passes the bimetal blade, thereby assuring that the resetting force cannot be applied to the bimetal blade while the overload current is still passing through the blade. The resetting arrangement thus protects the circuit breaker components from distortion in the event that the resetting operation is performed before the abnormally high current which tripped the breaker is removed from the protected circuit.

Modifications of the present invention may occur to those skilled in the art, however, the scope of the invention is to be limited only by the appended claims.

The invention claimed is:

1. An overload circuit breaker comprising a base, an electrically conductive metal housing having a side wall, top and bottom walls and two opposite end walls, the bottom wall of said housing being adapted to be rigidly secured to said base, a tripping element comprising a bimetal blade and a resilient blade joined in end-to-end relation, the free end of said bimetal blade being pivotally supported on one of said housing end walls, an ambient temperature compensating bimetal member mounted on said top wall and pivotally supporting the free end of said resilient blade, said tripping element being deformed under longitudinal compression to assume either a first or second stable position on opposite sides of its support axis, an electrically conductive movable contact member carried on said tripping element and extending unidirectionally therewith, a fixed contact supported on said base and cooperating with said movable contact member, the contact surfaces thereby provided being closed against each other when said tripping element is in one of its stable positions and opened when said element is in its other stable position, electrical terminal means on said housing and said fixed contact whereby when said contact surfaces are closed an electrical circuit is provided through said housing, said bimetal blade, said movable contact member and said contact surfaces, said bimetal blade moving said tripping element with a snap-action from said one of its stable positions to its other stable position upon flow of a predetermined electrical current through said circuit, and means for delaying said movement of the tripping element in response to said predetermined current comprising an element having a relatively high coefficient of thermal conductivity and a high mass to surface area ratio, said element being mounted on said bimetal blade and providing a thermal reservoir therefor.

2. An overload circuit breaker comprising a base, an electrically conductive metal housing having a side wall, top and bottom walls and two opposite end walls, the bottom wall of said housing being adapted to be rigidly secured to said base, a tripping element comprising a bimetal blade and a resilient blade joined in end-to-end relation, the free end of said bimetal blade being pivotally supported on one of said housing end walls, means carried by said housing pivotally supporting the free end of said resilient blade, said tripping element being deformed under longitudinal compression to assume either a first or second stable position on opposite sides of its support axis, a movable contact carried by said tripping element, a fixed contact supported on said base and cooperating with said movable contact, the contact surfaces thereby provided being closed against each other when said tripping element is in one of its stable positions and opened when said element is in its other stable position, electrical terminal means on said housing and said fixed contact whereby when said contact surfaces are closed an electrical circuit is provided through said housing, said bimetal blade, said movable contact and said fixed contact, said bimetal blade moving said tripping element with a snap-action from said one of its stable positions to its other stable position upon flow of a predetermined electrical current through said circuit, and means for delaying said movement of the tripping element in response to said predetermined current comprising an element having a relatively high coefficient of thermal conductivity and a high mass to surface area ratio, said element being mounted on said bimetal blade and providing a thermal reservoir therefor.

3. An overload circuit breaker comprising a base, an electrically conductive metal housing having a side wall, top and bottom walls and two opposite end walls, the bottom wall of said housing being adapted to be rigidly secured to said base, a tripping element comprising a bimetal blade and a resilient blade joined in end-to-end relation, the free end of said bimetal blade being pivotally supported on one of said housing end walls, an ambient temperature compensating bimetal member mounted on said top wall and pivotally supporting the free end of said resilient blade, said tripping element being deformed under longitudinal compression to assume either a first or second stable position on opposite sides of its support axis, an electrically conductive movable contact member carried on said tripping element and coextensive therewith, a fixed contact supported on said base and cooperating with said movable contact member, the contact surfaces thereby provided being closed against each other when said tripping element is in one of its stable positions and opened when said blade is in its other stable position, electrical terminal means on said housing and said fixed contact whereby when said contact surfaces are closed an electrical circuit is provided through said housing, said bimetal blade, said movable contact member and said contact surfaces, said tripping element moving with a snap-action from said one of its stable positions to its other stable position upon flow of a predetermined electrical current through said circuit.

4. An overload circuit breaker comprising a base, an electrically conductive metal housing having a side wall, top and bottom walls and two opposite end walls, the bottom wall of said housing being adapted to be rigidly secured to said base, a tripping element comprising a bimetal blade and a resilient blade joined in end-to-end relation, the free end of said bimetal blade being pivotally supported on one of said housing end walls, an ambient temperature compensating bimetal member mounted on said top wall and pivotally supporting the free end of said resilient blade, said tripping element being deformed under longitudinal compression to assume either a first or second stable position on opposite sides of its support axis, an electrically conductive movable contact member carried on said tripping element and coextensive therewith, a fixed contact supported on said base and cooperating with said movable contact member, the contact surfaces thereby provided being closed against each other when said tripping element is in one of its stable positions and opened when said element is in its other stable position, electrical terminal means on said housing and said fixed contact whereby when said contact surfaces are closed an electrical circuit is provided through said housing, said bimetal blade, said movable contact member and said contact surfaces, said bimetal blade moving said tripping element moving with a snap-action from said one of its stable positions to its other stable position upon flow of a predetermined electrical current through said circuit, means for delaying said movement of the tripping element in response to said predetermined current comprising an element having a relatively high coefficient of thermal conductivity and a high mass to surface area ratio, said element being mounted on said bimetal blade and providing a thermal reservoir therefor, and a reset member accessible exteriorly of said housing and associated with said tripping element for resetting said element into its said one stable position.

5. An overload circuit breaker comprising a base, an electrically conductive metal housing having a top wall and opposing end walls, a tripping element comprising a bimetal blade and a resilient blade joined in end-to-end relation, the free ends of said bimetal blade being pivotally supported on one of said housing end walls, means carried by said housing pivotally supporting the free end of said resilient blade, said tripping element being deformed under longitudinal compression to assume either a first or second stable position on opposite sides of its support axis, an electrically conductive movable contact member carried by said tripping element, a fixed contact supported on said base and cooperating with said movable contact member, the contact surfaces thereby provided being closed against each other when said tripping element is in one of its stable positions and opened when said element is in its other stable position, electrical terminal means on said housing and said fixed contact whereby when said contact surfaces are closed an electrical circuit is provided through said housing, said tripping element, said movable contact member and said contact surfaces, said bimetal blade moving said tripping element with a snap-action from said one of its stable positions to its other stable position upon flow of a predetermined electrical current through said circuit, and reset means for manually returning said tripping element to its said one stable position comprising a first spring blade supported within said houing by said top wall, a second spring blade supported by said tripping element and adapted to contact said first spring blade when said tripping element is in its said other stable position, a thrust pin accessible exteriorly of said housing for applying a resetting force to said tripping element through said first and second spring blades, the elastic system formed by said spring blades preventing deformation of said tripping element during the resetting operation, the engagement of said spring blades providing a shunting circuit for said tripping element.

6. An overload circuit breaker comprising a base, an electrically conductive metal housing having a top wall and opposing end walls, a tripping element comprising a bimetal blade and a resilient blade joined in end-to-end relation, the free end of said bimetal blade being pivotally supported on one of said housing end walls, means carried by said housing pivotally supporting the free end of said resilient blade, said tripping element being deformed under longitudinal compression to assume either a first or second stable position on opposite sides of its support axis, an electrically conductive movable contact member carried by said tripping element, a fixed contact supported on said base and cooperating with said movable contact member, the contact surfaces thereby provided being closed against each other when said tripping element is in one of its stable positions and opened when said element is in its other stable position, electrical terminal means on said housing and said fixed contact whereby when said contact surfaces are closed an electrical circuit is provided through said housing, said tripping element, said movable contact member and said contact surfaces, said bimetal blade moving said tripping with a snap-action from said one of its stable positions to its other stable position upon flow of a predetermined electrical current through said circuit, and reset means for manually returning said tripping element to its said one stable position comprising cooperating resilient elements carried by said housing and said tripping element, a thrust pin accessible exteriorly of said housing for applying a resetting force to said tripping element through said cooperating resilient means, the elastic system formed by said cooperating resilient means, the elastic system formed by said cooperating resilient means preventing deformation of said tripping element during the resetting operation.

7. An overload circuit breaker comprising a base, an electrically conductive metal housing having a side wall, top and bottom walls and two opposite end walls, the bottom wall of said housing being adapted to be rigidly secured to said base, a tripping element comprising a bimetal blade and a resilient blade joined in end-to-end relation, the free end of said bimetal blade being pivotally supported on one of said housing end walls, means carried by said housing pivotally supporting the free end of said resilient blade, said tripping element being deformed under longitudinal compression to assume either a first or second stable position on opposite sides of its support axis, a movable contact carried by said tripping element intermediate its ends, a fixed contact supported on said base and cooperating with said movable contact, the contact surfaces thereby provided being closed against each other when said tripping element is in one of its stable positions and opened when said element is in its other stable position, electrical terminal means carried by said housing whereby when said contact surfaces are closed an electrical circuit is provided through said housing, said bimetal blade, said movable contact and said fixed contact, said tripping element moving with a snap-action from said one of its stable positions to its other stable position upon flow of a predetermined electrical current through said circuit, and means for adjusting the value of said predetermined electrical current, said means including a portion of said one of said housing end walls which is weakened against bending stress and adapted to be deformed to vary the longitudinal stress on said bimetal blade.

References Cited in the file of this patent

UNITED STATES PATENTS

| | | |
|---|---|---|
| 2,463,891 | Malone | Mar. 8, 1949 |
| 2,496,135 | Sedwitz | Jan. 31, 1950 |
| 2,549,532 | Seaman | Apr. 17, 1951 |
| 2,700,715 | Petersen | Jan. 25, 1955 |
| 2,839,633 | Moyer | June 17, 1958 |

FOREIGN PATENTS

| | | |
|---|---|---|
| 339,705 | Great Britain | Dec. 18, 1930 |